United States Patent

Ihara et al.

(10) Patent No.: US 7,889,884 B2
(45) Date of Patent: Feb. 15, 2011

(54) IMAGE PROCESSING APPARATUS AND METHOD

(75) Inventors: Fujio Ihara, Kanagawa (JP); Kanya Ishizaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 951 days.

(21) Appl. No.: 11/245,154

(22) Filed: Oct. 7, 2005

(65) Prior Publication Data

US 2006/0215183 A1   Sep. 28, 2006

(30) Foreign Application Priority Data

Mar. 28, 2005   (JP) .............................. 2005-092931

(51) Int. Cl.
*G06K 9/00* (2006.01)
*G06K 15/00* (2006.01)

(52) U.S. Cl. ................. 382/100; 382/232; 382/183; 358/1.1; 358/3.19; 358/536; 358/3.28; 358/1.16; 358/403; 358/464; 713/176; 380/54; 380/55

(58) Field of Classification Search ................. 382/100, 382/232; 380/252, 287, 54, 51, 55, 210; 713/176; 358/3.28, 3.06, 3.19, 536, 100, 358/1.1
See application file for complete search history.

(56) References Cited

U.S. PATENT DOCUMENTS

| | | | | | |
|---|---|---|---|---|---|
| 4,196,451 | A | * | 4/1980 | Pellar | 358/534 |
| 5,946,414 | A | * | 8/1999 | Cass et al. | 382/183 |
| 6,141,441 | A | * | 10/2000 | Cass et al. | 382/166 |
| 6,252,971 | B1 | * | 6/2001 | Wang | 382/100 |
| 6,384,935 | B1 | * | 5/2002 | Yamazaki | 358/1.9 |
| 6,515,768 | B1 | * | 2/2003 | Deschuytere et al. | 358/3.06 |
| 6,798,539 | B1 | * | 9/2004 | Wang et al. | 358/1.9 |
| 6,856,429 | B1 | * | 2/2005 | Noguchi et al. | 358/1.9 |
| 6,985,262 | B2 | * | 1/2006 | Wang | 358/3.26 |
| 7,058,202 | B2 | * | 6/2006 | Amidror | 382/100 |
| 7,080,041 | B2 | * | 7/2006 | Nagel | 705/51 |
| 7,162,035 | B1 | * | 1/2007 | Durst et al. | 380/54 |
| 7,277,557 | B2 | * | 10/2007 | Ihara | 382/100 |
| 7,333,268 | B2 | * | 2/2008 | Steenblik et al. | 359/619 |
| 7,352,879 | B2 | * | 4/2008 | Wang | 382/100 |

(Continued)

FOREIGN PATENT DOCUMENTS

JP   2002-223346   *   1/2001

(Continued)

OTHER PUBLICATIONS

Machine translation of JP2002-223346.*

(Continued)

*Primary Examiner*—Wesley Tucker
*Assistant Examiner*—Nancy Bitar
(74) *Attorney, Agent, or Firm*—Oliff & Berridge, PLC

(57) ABSTRACT

An image processing apparatus includes an information acquiring portion that acquires information on image process conditions for processing image data, a creating portion that creates additional image data, serving as a watermark image, with additional information to be embedded into the image data on the basis of the information on the image process conditions acquired, and a merging portion that merges the image data with the additional image data to create composite image data.

6 Claims, 4 Drawing Sheets

U.S. PATENT DOCUMENTS

| | | | |
|---|---|---|---|
| 7,619,607 B2 * | 11/2009 | Zhang et al. | 345/104 |
| 2001/0055390 A1 * | 12/2001 | Hayashi et al. | 380/220 |
| 2002/0002679 A1 * | 1/2002 | Murakami et al. | 713/176 |
| 2004/0001604 A1 * | 1/2004 | Amidror | 382/100 |
| 2004/0004604 A1 * | 1/2004 | Numano | 345/173 |
| 2006/0170975 A1 * | 8/2006 | Wang | 358/3.06 |

FOREIGN PATENT DOCUMENTS

| | | |
|---|---|---|
| JP | 2002-223346 A | 8/2002 |
| JP | 2004-140764 A | 5/2004 |

OTHER PUBLICATIONS

Abstract of JP-2002223346.*

* cited by examiner

FIG. 5A
ADDITIONAL INFORMATION "1"
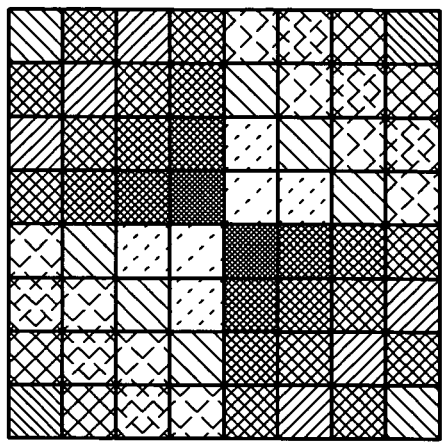
EDGE
FIG. 5B
ADDITIONAL INFORMATION "0"
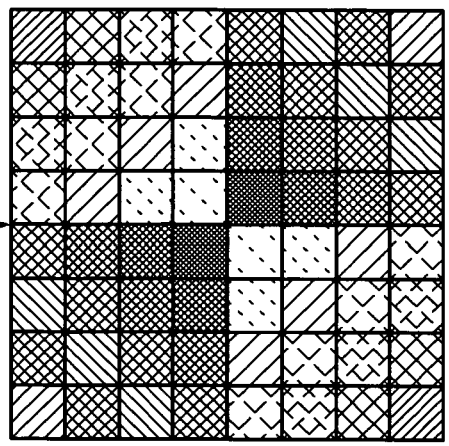
EDGE
FIG. 6A
ADDITIONAL INFORMATION "1"
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
FIG. 6B
ADDITIONAL INFORMATION "0"
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |

PRIOR TO AFFINE FORMATION

SUBSEQUENT TO AFFINE FORMATION

IMAGE PROCESSING APPARATUS AND METHOD

BACKGROUND OF THE INVENTION

1. Field of the Invention

This invention relates to image processing apparatuses that embed additional information into digital images.

2. Description of the Related Art

Copyright management is important and essential, in addition to copyright protection of intellectual property such as printed document. Digital watermarking is one of the methods for managing the intellectual property.

However, embedding a digital pattern into image data regardless of image process conditions for processing the image data, for example, a screen angle or a screen structure, could cause degradation in image quality.

SUMMARY OF THE INVENTION

The present invention has been made in view of the above circumstances.

According to one aspect of the present invention, there may be provided an image processing apparatus including an information acquiring portion that acquires information on image process conditions for processing image data; a creating portion that creates additional image data, serving as a watermark image, with additional information to be embedded into the image data on the basis of the information on the image process conditions acquired; and a merging portion that merges the image data with the additional image data to create composite image data.

According to another aspect of the present invention, there may be provided an image processing method including acquiring information on image process conditions for processing image data; creating additional image data, serving as a watermark image, with additional information to be embedded into the image data on the basis of the information on the image process conditions acquired; and merging the image data with the additional image data to create composite image data.

According to a further aspect of the present invention, there may be provided a storage medium readable by a computer to execute a process of image processing on a computer, the function of the storage medium including acquiring information on image process conditions for processing image data; creating additional image data, serving as a watermark image, with additional information to be embedded into the image data on the basis of the information on the image process conditions acquired; and merging the image data with the additional image data to create composite image data.

BRIEF DESCRIPTION OF THE DRAWINGS

Embodiments of the present invention will be described in detail based on the following figures, wherein:

FIG. 5 is a pattern example used for creating additional image data;
FIGS. 6A and 6B show examples of pattern creation.

DESCRIPTION OF THE EMBODIMENTS

A description will now be given, with reference to the accompanying drawings, of embodiments of the present invention.

Figure 1:
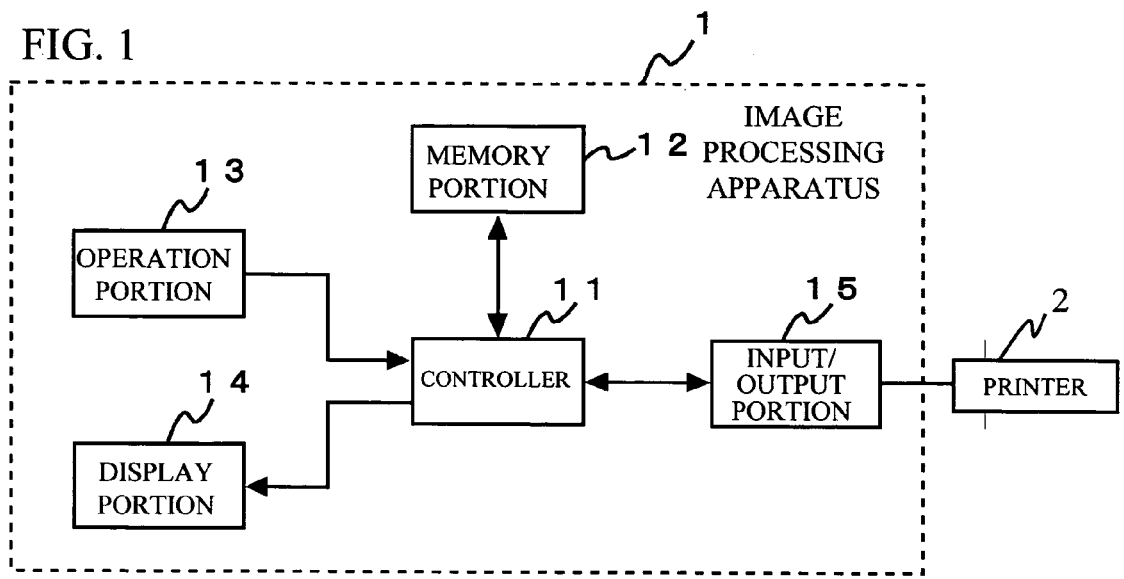
FIG. 1 is a block diagram showing a configuration of an image processing apparatus in accordance with an embodiment of the present invention.

Referring to FIG. 1, a description will now be given of a configuration in accordance with an embodiment of the present invention. An image processing apparatus 1 in accordance with an embodiment of the present invention includes a controller 11, a memory portion 12, an operation portion 13, a display portion 14, and an input/output portion 15. The image processing apparatus 1 is connected to a printer 2 to serve as an image forming apparatus.

The controller 11 operates according to an image processing program stored in the memory portion 12, and merges image data to be processed with data of additional image (watermark image) to be embedded, on the basis of additional information so as to create composite image data. This process will be described later in detail.

The memory portion 12 retains the program executed by the controller 11, and includes a computer-readable memory device. The memory portion 12 also functions as a work memory that stores various types of data produced in the process of image processing controlled by the controller 11. In accordance with the present embodiment, a driver program for the printer 2 is also stored, and screen information of the printer 2 is retained in the afore-mentioned driver program.

The operation portion 13 is a keyboard, mouse, or the like. The operation portion 13, after receiving an instruction from a user, outputs the instruction to the controller 11. The display portion 14 provides the user with the information according to the instruction applied from the controller 11. The input/output portion 15 outputs data input from outside to the controller 11. In addition, the input/output portion 15 outputs the data to the printer 2 according to the instruction applied from the controller 11.

A description will now be given of the process of the controller 11 in more detail. The controller 11 stores the image data to be processed in the memory portion 12, merges the image data with the additional image data according to the program to be described in the following, and outputs the image data that has been merged to the printer 2 via the input/output portion 15.

Figure 2:
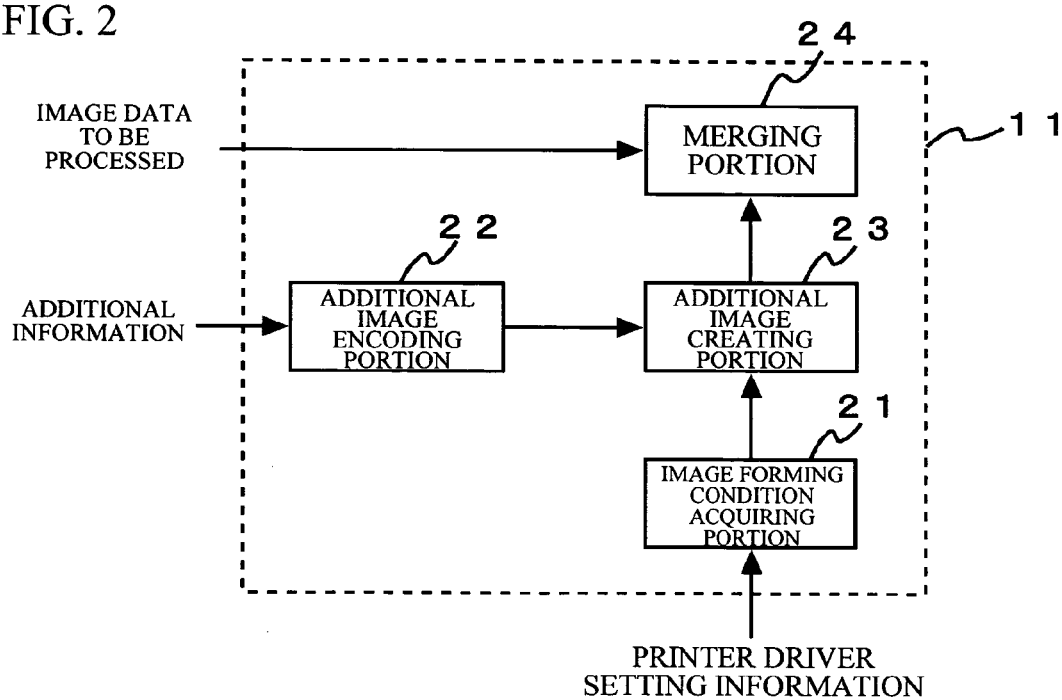
FIG. 2 is an example of encode processing in the image processing apparatus in accordance with an embodiment of the present invention.

The program executed by the controller 11, as shown in FIG. 2, functionally includes an image forming condition acquiring portion 21, an additional image encoding portion 22, an additional image creating portion 23, and a merging portion 24.

The image forming condition acquiring portion 21 acquires setting information of the printer driver from the memory portion 12 so as to get the information related to image processing prior to the image creation in the printer 2, as conditions of the image formation (for example, the screen information used for the pseudo-tone processing method).

The additional image encoding portion 22 encodes the additional information with the use of a predetermined error-correcting system.

Figure 3:
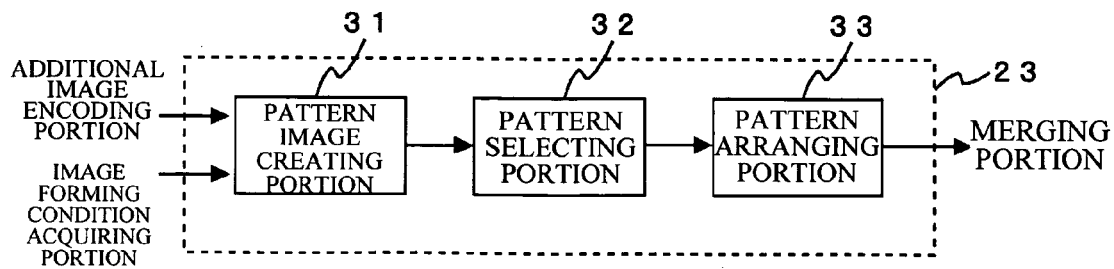
FIG. 3 is an example of an additional image creating portion in accordance with an embodiment of the present invention.

The additional image creating portion 23 creates the additional image data to correspond to the conditions acquired by the image forming condition acquiring portion 21 and the output from the additional image encoding portion 22. Specifically, the additional image creating portion 23, as shown in FIG. 3, includes a pattern image creating portion 31, a pattern selecting portion 32, and a pattern arranging portion 33. The pattern image creating portion 31 creates multiple pattern images corresponding to respective codes. The pattern selecting portion 32 selects one from the multiple pattern images. The pattern arranging portion 33 arranges the pattern image selected.

The pattern image creating portion 31 creates and outputs the data of multiple pattern images that correspond to the respective codes, on the basis of the conditions acquired by the image forming condition acquiring portion 21. A description will be given in detail as follows.

Figure 4A:
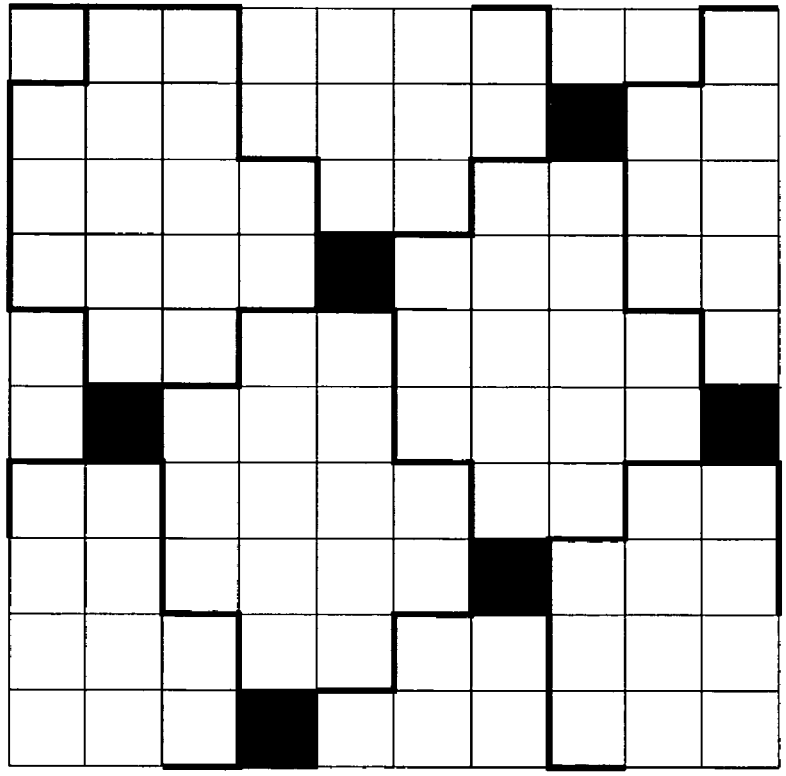
FIG. 4A shows a screen pattern.
Figure 4B:
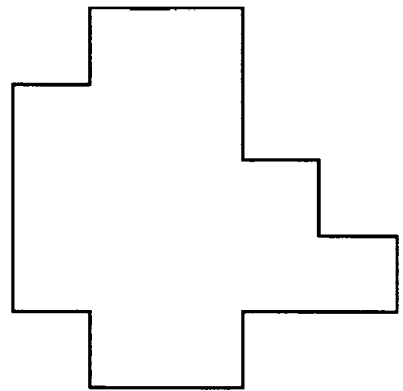
FIG. 4B shows a screen lattice.
Figure 4C:
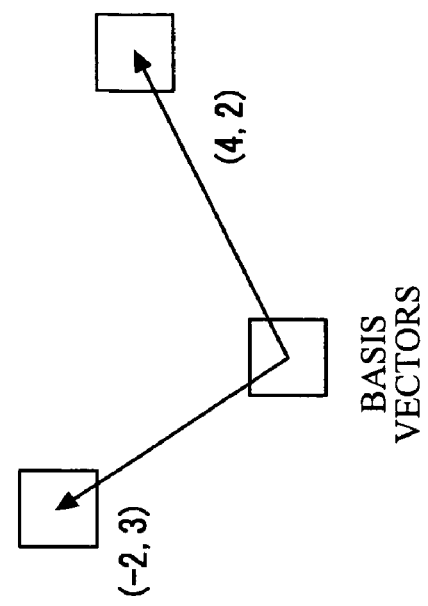
FIG. 4C shows basis vectors of the screen lattice.

Firstly, the pattern image creating portion 31 acquires the information on a basis of a screen lattice from the information related to the screen acquired by the image forming condition acquiring portion 21. Here, the basis of the screen lattice represents vectors of two directions that define the screen shape, which is generally a parallelogram. With respect to the screen shape as shown in FIGS. 4A through 4C, the basis vectors of the screen lattice are (4, 2) and (−2, 3). FIG. 4A shows a screen pattern. FIG. 4B shows a screen lattice. FIG. 4C shows basis vectors of the screen lattice.

The pattern image creating portion 31 creates an embedded pattern similar to integral multiplication of the above-mentioned screen shape. The integral multiplication has a purpose of avoiding the moire, yet if the pattern shape is too small relative to the actual printed area, it will be difficult to decode the additional information. Therefore, the size has to be adjusted according to the print resolution. The screen area and a threshold value are compared. If the screen area is smaller than the threshold value, the pattern size is set to four times the screen area. For example, if the screen shown in FIG. 4A is used and the print resolution is 600 dpi, it is desirable that the pattern shape to be embedded should employ the parallelogram created by (8, 4) and (−4, 6), which are twice the basis vectors of the screen lattice respectively.

Specifically, with respect to the image density of the pattern, preferably, the pattern disclosed in the printed document in Japanese Patent Application Publication No. 2004-140764 is changed into a parallelogram. Now, a description will be given, with reference to FIGS. 5A through 6B, of characteristics of the pattern described in the printed document in Japanese Patent Application Publication No. 2004-140764.

FIGS. 5A and 5B show pattern images described in the printed document in Japanese Patent Application Publication No. 2004-140764. Specifically, these pattern images, as shown in FIGS. 6A and 6B, are configured to define a basic pattern of FIG. 6A representing a code "1" and another basic pattern of FIG. 6B representing another code "0". These element values (pixel values) are obtained by respectively multiplying a value defined by an expression such as any of Expression (1) and (2) shown as follows, where C denotes an embedded strength and a denotes an attenuation rate. Assuming that C and α are designated by the user or the like in advance.

(Expressions)

$$xC \exp(-\alpha(|x|+|y|)) \quad (1)$$

$$xC \exp(-\alpha(x^2+y^2)) \quad (2)$$

In Expressions (1) and (2), X and Y respectively represent coordinates (X, Y) of each pixel, when the center of a pattern image is set to (X, Y)=(0, 0).

As a result of the above-mentioned multiplication, the pattern images are respectively created as shown in FIGS. 5A and 5B, according to the FIGS. 6A and 6B. In FIGS. 5A and 5B, the difference in the density is shown as the difference in hatching, for convenience of explanation. These pattern images have the following aspects:

(1) Adding corresponding pixels in both pattern images gives the same given values (for example, "0").

(2) Adding all pixels in each of the pattern images gives the same values (for example, "0").

(3) Each of the pattern images includes two lines discontinuing the pixels (referred to as edge), which pass through the center of the image and have different directions. In FIGS. 5A and 5B, the edges are crossed at right angle.

(4) The absolute values of the pixel values in each pattern image are greatest at the center, and become smaller as further from the center.

The codes are represented by the patterns having the areas as described above so as to obtain the decoding tolerance of the embedded signal relative to the various types of image processing for printing. The image density is prevented from changing largely after merge (owing to the aspects of (1) and (2)), the detection of the pattern image and decode processing are facilitated (owing to the aspects of (2) and (3)), and the occurrence of the edge between the patterns are prevented. Therefore, the printed document in Japanese Patent Application Publication No. 2004-140764 describes that the pattern is not visibly outstanding. The above-mentioned aspects are retainable even after the pattern image of rectangular shape is changed into that of parallelogram by the affine transformation (linear transformation).

Furthermore, according to the printed document in Japanese Patent Application Publication No. 2004-140764, the pixel values are respectively added in the areas respectively corresponding to quadrants segmented by the edges in the pattern image when the image merged with the pattern image is decoded. The quadrants are defined by first through fourth quadrants, namely, R1 through R4. For instance, if R1>R2 and R1>R4 and R3>R2, and R3>R4, the code is determined as "1". In other words, the printed document in Japanese Patent Application Publication No. 2004-140764 describes that decode can be accomplished by comparing the sums of groups of pixels in the respective quadrants, yet the four areas segmented by the edges are equal after the affine transformation. Therefore, the decode method same as the printed document in Japanese Patent Application Publication No. 2004-140764 can be used.

Now, the pattern image creating portion 31 creates a rectangular pattern of an appropriate size (for example, 8×8 pixels) in the method described in the printed document in Japanese Patent Application Publication No. 2004-140764, and the affine transformation is performed to change the pattern into a parallelogram to be used for an embedded pattern shape. The embedded patterns are created to correspond to the respective codes.

Figure 7A:
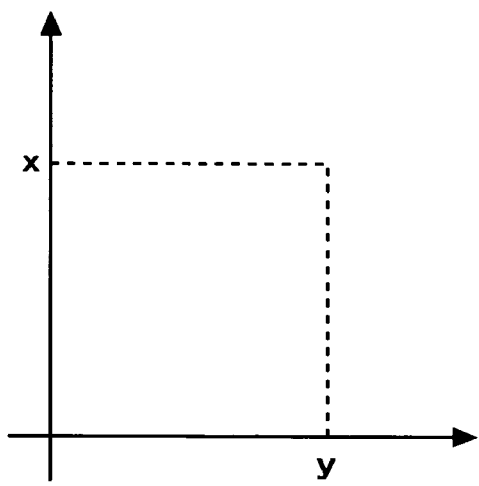
FIGS. 7A and 7B show affine transformation.
Figure 7B:
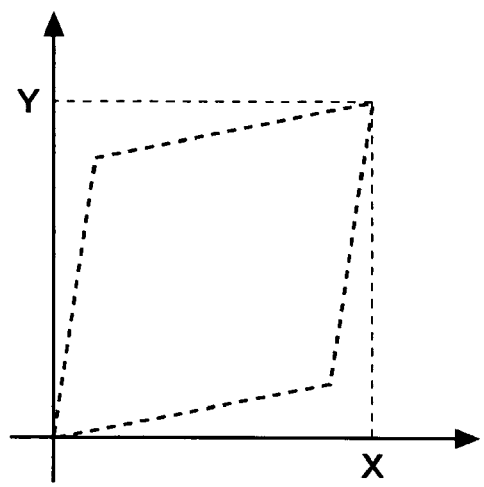

With respect to the affine transformation, coordinates prior to the transformation are set to (x, y) as shown in FIG. 7A, and the coordinates subsequent to the transformation are set to (X, Y) as shown in FIG. 7B. Origin of coordinates is set on the bottom left. The relationship is represented in the following expressions.

$$X=ax+by, Y=cx+dy.$$

Parameters a, b, c, and d are obtainable by working out the simultaneous equation with two pairs of parameters selected from among apexes of a quadrangle prior to and subsequent to transformation excluding the origin.

The pattern selecting portion 32 follows the instruction of the pattern arranging portion 33 and selects one of the multiple pattern images output from the pattern image creating portion 31.

Figure 8:
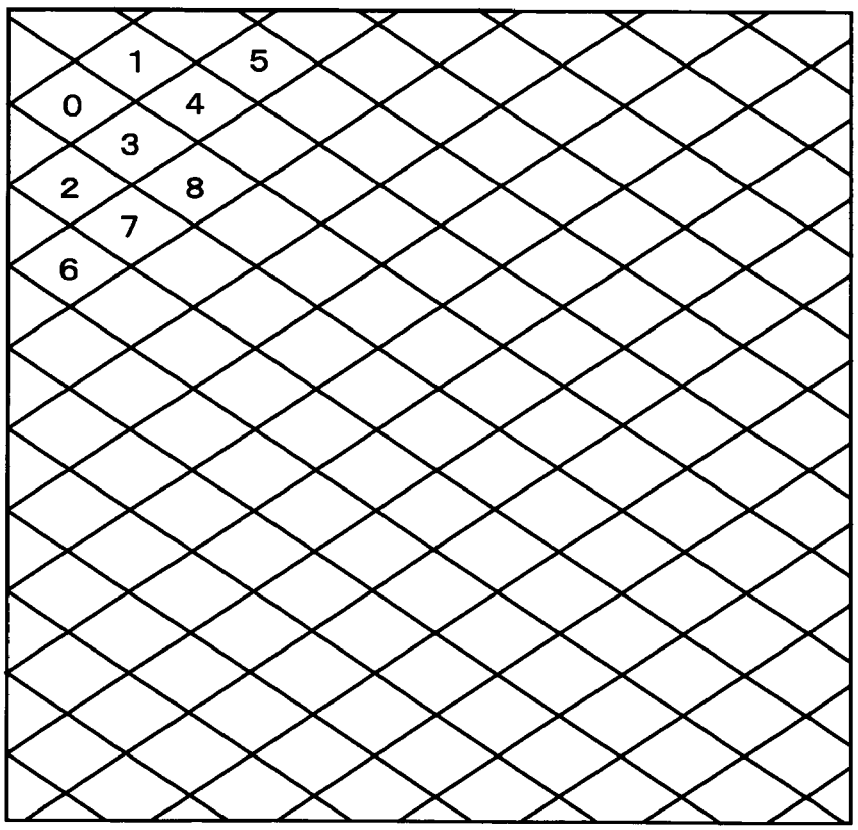
FIG. 8 shows how to arrange patterns.

Next, a description will be given, with reference to FIG. 8, of the pattern arranging portion 33 in detail. FIG. 8 shows a memory area that has the size same as that of an input image retained in a work area of the memory portion 12. In accordance with the present embodiment, the pattern image is created to correspond to the screen shape of parallelogram. Referring to FIG. 8, this produces incomplete patterns in area ends. The pattern arranging portion 33 searches for the position where the pattern of parallelogram fits, instead of the position that includes the incomplete pattern. The pattern arranging portion 33 firstly searches from top left to bottom (No. 0 in FIG. 8) for the position where a first pattern of parallelogram fits. If the position is found, bits are output from the additional image encoding portion 22 one by one and applied to the pattern selecting portion 32, so that the pattern image corresponding to the bits is obtained and inserted. Hereinafter, as numbers shown in FIG. 8, if there is another area that fits the pattern of parallelogram in an upper-right direction, the pattern continues to be inserted. If there is no area in the upper-right direction, go down by one size of parallelogram and repeat searching from the left end.

The merge portion 24 merges the additional image created by the additional image creating portion 23 with the image data to be processed. That is, the pixel value of the additional image is added to the pixel value corresponding to the image data to be processed stored in the memory portion 12, and is then output. Here, if the added value exceeds the maximum (for example, 255) of the pixel value, the added value is set to the maximum. If the added value falls below the minimum (for example, 0) of the pixel value, the added value is set to the minimum.

Subsequently, the image data merged with the additional image (watermark image) is processed by the controller 11, and is output to the printer via the input/output portion 15. The printer is supplied with the image data, and forms the image represented by the image data on a medium such as paper.

According to the embodiments of the present invention, it is desirable that when the input image data has a color and includes multiple color components, only one of the color components is processed. However, multiple color components may be processed. In addition, in accordance with the embodiment described above, the pattern image is created each time the image is input. However, the pattern image is created in advance and stored in the memory portion 12. Then, the pattern image may be read out of the memory portion 12.

As described above, on the information processing apparatus in the above-mentioned aspect, the information on image process conditions for processing image data is acquired and the additional image data, serving as a watermark image, with additional information to be embedded into the image data on the basis of the information on the image process conditions acquired. It is possible to embed the additional information according to the image processing characteristics. Therefore, this can prevent the degradation in image quality due to the image processing and the occurrence of the disturbance in decoding.

On the image processing apparatus in the above-mentioned aspect, the information on the image process conditions may include information on a screen angle used for a pseudo-tone processing. With the information on a screen angle used for a pseudo-tone processing, the additional image information can be created to avoid the interference with the screen.

On the image processing apparatus in the above-mentioned aspect, the creating portion may create multiple pattern images similar to a screen shape. The pattern image having a similarity to the screen shape prevents the interference with the screen and degradation in image quality.

On the image processing apparatus in the above-mentioned aspect, the creating portion may create a pattern image equal to the screen shape or that of integral multiplication of the screen shape. The pattern image equal to either the screen shape or integral multiplication of the screen shape prevents the interference with the screen and degradation in image quality.

On the image processing apparatus in the above-mentioned aspect, the merging portion may select pattern images corresponding to the additional information and arranges the multiple pattern images in a given order. This makes it possible to arrange the pattern images on the image data according to the additional information.

An information analysis method of the present invention is realized with a CPU (Central Processing Unit), ROM (Read Only Memory), RAM (Random Access Memory), and the like, by installing a program from a portable memory device or a storage device such as a hard disc device, CD-ROM, DVD, or a flexible disc or downloading the program through a communications line. Then the steps of program are executed as the CPU operates the program.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-092931 filed on Mar. 28, 2005 including specification, claims, drawings, and abstract is incorporated herein by reference in its entirety.

What is claimed is:

1. An image processing apparatus comprising:
   an information acquiring portion that acquires setting information of a printer driver on image process conditions for processing image data, the setting information including information on an angle of a screen lattice used for pseudo-tone processing;
   a creating portion that creates additional image data, serving as a watermark image, to be embedded into the image data based on the acquired information on the image process conditions and additional information; and
   a merging portion that merges the image data with the additional image data to create composite image data, wherein the creating portion creates a pattern image of an integral multiple of a screen shape, which is converted from a rectangular shape to a parallelogram shape by an affine process; wherein the pattern image has a size adjusted according to a print resolution and wherein the merging portion selects pattern images corresponding to the additional information and arranges multiple pattern images in a given order.

2. The image processing apparatus according to claim 1, wherein the creating portion creates multiple pattern images having a similarity to a screen shape.

3. An image processing method comprising:
   acquiring setting information of a printer driver on image process conditions for processing image data, the setting information including information on an angle of a screen lattice of a screen used for pseudo-tone processing;

creating additional image data, serving as a watermark image, to be embedded into the image data based on the acquired information on the image process conditions and additional information;

converting the screen from a rectangular shape to a parallelogram shape by an affine process;

merging the image data with the additional image data to create composite image data; and outputting the composite image data to the printer, wherein the created additional image data is a pattern image of an integral multiple of a screen shape; wherein the pattern image has a size adjusted according to a print resolution and selecting pattern images corresponding to the additional information and arranging multiple pattern images in a given order.

4. The image processing method according to claim 3, further comprising creating multiple pattern images having a similarity to a screen shape.

5. A non-transitory computer-readable medium encoded with instructions capable of being executed by a computer to perform image processing, the image processing comprising:

acquiring setting information of a printer driver on image process conditions for processing image data, the setting information including information on an angle of a screen lattice of a screen used for pseudo-tone processing;

creating additional image data, serving as a watermark image, to be embedded into the image data based on the acquired information on the image process conditions and additional information;

converting the screen shape from a rectangular shape to a parallelogram shape by an affine process;

merging the image data with the additional image data to create composite image data; and outputting the composite image data to the printer, wherein the created additional image data is a pattern image of an integral multiple of a screen shape; wherein the pattern image has a size adjusted according to a print resolution and selecting pattern images corresponding to the additional information and arranging multiple pattern images in a given order.

6. The non-transitory computer-readable medium according to claim 5, the image processing further creating multiple pattern images having a similarity to a screen shape.

* * * * *